United States Patent
Hodgins et al.

(10) Patent No.: US 12,231,071 B2
(45) Date of Patent: Feb. 18, 2025

(54) METHOD OF CONTROLLING A BRUSHLESS PERMANENT MAGNET MOTOR

(71) Applicant: Dyson Technology Limited, Wiltshire (GB)

(72) Inventors: Neil William Hodgins, Bristol (GB); Libo Zheng, Swindon (GB)

(73) Assignee: Dyson Technology Limited, Wiltshire (GB)

( * ) Notice: Subject to any disclaimer, the term of this patent is extended or adjusted under 35 U.S.C. 154(b) by 0 days.

(21) Appl. No.: 17/294,774

(22) PCT Filed: Oct. 16, 2019

(86) PCT No.: PCT/GB2019/052955
§ 371 (c)(1),
(2) Date: May 18, 2021

(87) PCT Pub. No.: WO2020/104765
PCT Pub. Date: May 28, 2020

(65) Prior Publication Data
US 2022/0014125 A1    Jan. 13, 2022

(30) Foreign Application Priority Data
Nov. 22, 2018 (GB) ..................... 1819004

(51) Int. Cl.
*H02P 6/08* (2016.01)
*H02P 6/15* (2016.01)
*H02P 25/03* (2016.01)

(52) U.S. Cl.
CPC ............... *H02P 6/15* (2016.02); *H02P 25/03* (2016.02)

(58) Field of Classification Search
CPC ............... H02P 6/08; H02P 6/15; H02P 25/03
See application file for complete search history.

(56) References Cited

U.S. PATENT DOCUMENTS

| 4,215,305 A | 7/1980 | D'Atre et al. |
| 4,584,505 A | 4/1986 | Chung et al. |

(Continued)

FOREIGN PATENT DOCUMENTS

| CA | 1089007 A | 11/1980 |
| CN | 102136820 A | 7/2011 |

(Continued)

OTHER PUBLICATIONS

International Search Report and Written Opinion dated Jan. 22, 2020, directed to International Application No. PCT/GB2019/052955; 9 pages.

(Continued)

*Primary Examiner* — Gabriel Agared
(74) *Attorney, Agent, or Firm* — Tucker Ellis LLP (57) ABSTRACT

A method of controlling a brushless permanent magnet motor includes determining a motor operating target. The method includes comparing the motor operating target to a set of pre-determined excitation timing parameter relationships. The method includes operating the motor in accordance with an excitation timing parameter relationship determined from the set of pre-determined excitation timing parameter relationships to provide a motor operating response close to the motor operating target. The method includes measuring a measured motor operating response, comparing the measured motor operating response to the motor operating target, and applying a correction factor to an excitation timing parameter of the motor when the measured motor operating response does not match the motor operating target, such that the measured motor operating response moves toward the motor operating target.

17 Claims, 8 Drawing Sheets

(56) References Cited

U.S. PATENT DOCUMENTS

| | | | |
|---|---|---|---|
| 4,628,233 A | 12/1986 | Bradus | |
| 4,743,815 A | 5/1988 | Gee et al. | |
| 4,749,927 A | 6/1988 | Rodal et al. | |
| 4,912,378 A | 3/1990 | Vukosavic | |
| 5,001,405 A | 3/1991 | Cassat | |
| 5,028,852 A | 7/1991 | Dunfield | |
| 5,223,772 A | 6/1993 | Carobolante | |
| 5,294,872 A | 3/1994 | Koharagi et al. | |
| 5,886,484 A | 3/1999 | Fucili et al. | |
| 6,633,144 B2 | 10/2003 | Barker et al. | |
| 6,803,735 B2 | 10/2004 | Liu et al. | |
| 7,638,959 B2 | 12/2009 | Rozman et al. | |
| 8,547,051 B2 | 10/2013 | Green et al. | |
| 9,263,979 B2 | 2/2016 | Zhang et al. | |
| 9,374,028 B2 | 6/2016 | Nondahl et al. | |
| 9,634,593 B2 | 4/2017 | Marcinkiewicz et al. | |
| 9,853,580 B2 | 12/2017 | Patton et al. | |
| 10,193,476 B1 * | 1/2019 | Wang | H02P 6/08 |
| 2010/0148710 A1 | 6/2010 | Lim et al. | |
| 2013/0082627 A1* | 4/2013 | Ichikawa | H02P 6/00 318/139 |
| 2013/0234633 A1* | 9/2013 | Bateman | H02P 6/18 318/400.06 |
| 2014/0210379 A1* | 7/2014 | Kato | H02P 6/153 318/139 |
| 2016/0190960 A1* | 6/2016 | Kawai | H02P 27/08 318/400.03 |
| 2016/0215720 A1 | 7/2016 | Graus et al. | |
| 2016/0248353 A1 | 8/2016 | Ungermann et al. | |
| 2017/0310256 A1 | 10/2017 | Zheng | |
| 2018/0013363 A1 | 1/2018 | Yamamoto et al. | |
| 2018/0198398 A1 | 7/2018 | Strong et al. | |

FOREIGN PATENT DOCUMENTS

| | | |
|---|---|---|
| CN | 106849807 A | 6/2017 |
| CN | 107395071 A | 11/2017 |
| CN | 107147336 B | 9/2019 |
| DE | 102016211153 A1 | 12/2017 |
| DE | 102017121829 A1 | 3/2019 |
| EP | 0221244 A2 | 5/1987 |
| EP | 0610671 A1 | 8/1994 |
| EP | 2760124 A2 | 7/2014 |
| EP | 3182576 A1 | 6/2017 |
| GB | 2469135 A | 10/2010 |
| GB | 2469142 A | 10/2010 |
| GB | 2496867 A | 5/2013 |
| GB | 2515085 A | 12/2014 |
| JP | 56046680 A | 4/1981 |
| JP | 58072378 A | 4/1983 |
| JP | 05-284768 A | 10/1993 |
| JP | 2007-520989 A | 7/2007 |
| JP | 2010-246385 A | 10/2010 |
| JP | 2011-239599 A | 11/2011 |
| JP | 2015-002676 A | 1/2015 |
| JP | 2017-209017 A | 11/2017 |
| JP | 2018-182836 A | 11/2018 |
| WO | 2005/076454 A1 | 8/2005 |

OTHER PUBLICATIONS

Search Report dated May 16, 2019, directed to GB Application No. 1819004.1; 1 page.
Office Action received for Japanese Patent Application No. 2021-526549, mailed on May 10, 2022, 10 pages (6 pages of English Translation and 4 pages of Original Document).
Office Action received for Chinese Patent Application No. 201980076817.8, mailed on Oct. 23, 2023, 21 pages (12 pages of English Translation and 9 pages of Original Document).
Office Action received for Korean Patent Application No. 10-2021-7016783, mailed on Sep. 5, 2023, 10 pages (05 pages of English Translation and 05 pages of Original Document).

* cited by examiner

| Control Signals | | | | Power Switches | | | | Inverter Condition |
|---|---|---|---|---|---|---|---|---|
| S1 | S2 | S3 | S4 | Q1 | Q2 | Q3 | Q4 | |
| 0 | 0 | 0 | 0 | 0 | 0 | 0 | 0 | Off |
| 1 | 0 | 0 | 1 | 1 | 0 | 0 | 1 | Excite Left-to-right |
| 0 | 1 | 1 | 0 | 0 | 1 | 1 | 0 | Excite Right-to-left |
| 0 | 1 | 0 | 1 | 0 | 1 | 0 | 1 | Body Freewheel |
| 0 | 0 | 0 | 1 | 0 | 0 | 0 | 1 | Diode Freewheel Left-to-right |
| 0 | 1 | 0 | 0 | 0 | 1 | 0 | 0 | Diode Freewheel Right-to-left |

METHOD OF CONTROLLING A BRUSHLESS PERMANENT MAGNET MOTOR

REFERENCE TO RELATED APPLICATIONS

This application is a national phase application under 35 USC 371 of International Application No. PCT/GB2019/052955, filed Oct. 16, 2019, which claims the priority of United Kingdom Application No. 1819004.1, filed Nov. 22, 2018, the entire contents of each of which are incorporated herein by reference.

FIELD OF THE DISCLOSURE

The present invention relates to a method of controlling a brushless permanent magnet motor.

BACKGROUND OF THE DISCLOSURE

Brushless permanent magnet motors comprise phase windings which are excited via a power source in such a manner that the magnetic fields induced in the windings drive rotation of a rotor of the motor.

It has previously been proposed to vary excitation timing parameters of the phase windings of a motor, for example start/end time of excitation, length of excitation, or duty cycle of excitation, to provide desired motor operating characteristics.

SUMMARY OF THE DISCLOSURE

According to a first aspect of the present invention there is provided a method of controlling a brushless permanent magnet motor, the method comprising determining a motor operating target, comparing the motor operating target to a set of pre-determined excitation timing parameter relationships, operating the motor in accordance with an excitation timing parameter relationship determined from the set of pre-determined excitation timing parameter relationships to provide a motor operating response close to the motor operating target, measuring a measured motor operating response, comparing the measured motor operating response to the motor operating target, and applying a correction factor to an excitation timing parameter of the motor when the measured motor operating response does not match the motor operating target, such that the measured motor operating response moves toward the motor operating target.

The method according to the first aspect of the present invention may be beneficial principally as the method comprises comparing the motor operating target to a set of pre-determined excitation timing parameter relationships, operating the motor in accordance with an excitation timing parameter relationship determined from the set of pre-determined excitation timing parameter relationships to provide a motor operating response close to the motor operating target, measuring a measured motor operating response, comparing the measured motor operating response to the motor operating target, and applying a correction factor to an excitation timing parameter of the motor when the measured motor operating response does not match the motor operating target. In particular, by measuring a measured motor operating response, comparing the measured motor operating response to the motor operating target, and applying a correction factor to an excitation timing parameter of the motor when the measured motor operating response does not match the motor operating target, the motor operating response may be closely controlled to match the motor operating target, for example in a closed feedback loop manner. However, simply controlling the brushless permanent magnet motor in such a closed loop manner may result in unstable or inefficient control, for example as a result of large correction factors being required to compensate for errors between the measured motor operating response and the motor operating target.

By comparing the motor operating target to a set of pre-determined excitation timing parameter relationships, and operating the motor in accordance with an excitation timing parameter relationship determined from the set of pre-determined excitation timing parameter relationships to provide a motor operating response close to the motor operating target, the closed loop control may be provided with a starting point sufficiently close to the motor operating target that large correction factors to the excitation timing parameters are not required. Hence the method according to the first aspect of the present invention may provide greater stability and improved motor performance, for example relative to a method which simply uses closed loop control.

Furthermore, the method according to the first aspect of the present invention may provide an improved response time, which may result in a reduction in the time taken for the measured motor operating response to reach the motor operating target.

Determining a motor operating target, comparing the motor operating target to a set of pre-determined excitation timing parameter relationships, and operating the motor in accordance with an excitation timing parameter relationship determined from the set of pre-determined excitation timing parameter relationships to provide a motor operating response close to the motor operating target, may comprise open loop control.

Measuring a measured motor operating response, comparing the measured motor operating response to the motor operating target, and applying a correction factor to an excitation timing parameter of the motor when the measured motor operating response does not match the motor operating target, such that the measured motor operating response moves toward the motor operating target, may comprise closed loop control.

The excitation timing parameter may comprise a parameter which defines when the motor, for example a phase winding of the motor, is commutated and/or when excitation of the motor, for example a phase winding of the motor, begins and/or ends, and/or how long the motor, for example a phase winding of the motor, is excited for. Excitation of the motor may comprise driving a phase current through a phase winding of the motor. The excitation timing parameter may be determined by a plurality of factors, including, for example, the speed of the brushless permanent magnet motor and/or an input voltage of a system comprising the brushless permanent magnet motor.

The excitation timing parameter may comprise an advance angle, for example a phase angle at which commutation of a phase winding of the motor occurs and hence a phase angle at which excitation of the phase winding begins. The advance angle may be measured relative to a zero-crossing of back EMF induced in the phase winding. Whilst referred to as an advance angle, which may imply that commutation of the phase winding occurs in advance of a zero-crossing of back EMF induced in the phase winding, the advance angle may comprise a positive, negative, or zero value. Thus commutation of the phase winding may occur in advance of, after, or synchronously with, a zero-crossing of back EMF induced in the phase winding. Where the advance angle takes on a negative value, the advance angle may instead be referred to as a retard angle, as commutation of the phase winding may be retarded relative to a zero-crossing of back EMF induced in the phase winding.

The method may comprise a method of controlling a multiphase brushless permanent magnet motor. In a multiphase brushless permanent magnet motor, the stator windings are arranged in so that the EMF of different motor phases is available in combination at the motor terminals. The most common connection arrangements between motor windings and terminals are known as star (also known as wye) connection and delta connection. The advance angle in the case of a multiphase machine may be measured relative to the point in rotation where the EMF between two motor terminals equals and subsequently exceeds that of any other combination of terminal connections. Whilst referred to as an advance angle, which may imply that the phase shift of the applied driving DC voltage waveform occurs in advance of this point, the advance angle may comprise a positive, negative, or zero value. Thus the applied voltage waveform may be shifted in advance of, after, or synchronously with the point in rotation where the largest EMF phase combination changes. Where the advance angle takes on a negative value, the advance angle may instead be referred to as a retard angle, as commutation of the phase winding may be retarded relative to a change in largest EMF phase combination.

The excitation timing parameter may comprise a conduction period, for example a period of time over which excitation of the motor occurs. The excitation timing parameter may comprise a duty cycle, for example a ratio defining over what percentage of a cycle excitation occurs. The excitation timing parameter may comprise an advance angle and a conduction period, or may comprise an advance angle and a duty cycle. The excitation timing parameter may comprise a sine wave amplitude, or other waveform amplitude. The excitation timing parameter may comprise a de-energisation angle and/or period, for example a time at which de-energisation of a phase winding of the motor begins and/or a time period over which de-energisation of the phase winding occurs.

The motor operating target may comprise any, or any combination of, motor input power, motor speed, airflow through the motor, phase voltage, DC link voltage, phase current, supply current, motor pressure, motor temperature, and an error function combining any of the aforementioned parameters.

An excitation timing parameter relationship may comprise a relationship between a motor operating target or response and a motor excitation timing parameter, for example which motor excitation timing parameter achieves which motor operating target or response. An excitation timing parameter relationship may comprise a plurality of excitation timing parameters which determine a motor operating target or response, for example a motor operating target or response may be determined by a plurality of excitation timing parameters.

The excitation timing parameter relationship determined from the set of pre-determined excitation timing parameter relationships may correspond substantially to an excitation timing parameter relationship chosen from the set of pre-determined excitation timing parameter relationships. For example, the excitation timing parameter relationship determined from the set of pre-determined excitation timing parameter relationships may be an excitation timing parameter relationship chosen from the set of pre-determined excitation timing parameter relationship The excitation timing parameter relationship determined from the set of pre-determined excitation timing parameter relationships may be derived from, for example extrapolated from, an excitation timing parameter relationship from the set of pre-determined excitation timing parameter relationships. The excitation timing parameter relationship determined from the set of pre-determined excitation timing parameter relationships may be derived from, for example interpolated from, at least two excitation timing parameter relationships from the set of pre-determined excitation timing parameter relationships The set of pre-determined excitation timing parameter relationships may be determined via experimentation and/or simulation and/or monitoring, and may, for example, be stored in memory of a controller of the brushless permanent magnet motor. Relationships within the set of pre-determined excitation timing parameter relationships may be sufficiently close to one another such that transitions between relationships are substantially inaudible to a user of the brushless permanent magnet motor in use. For example, relationships within the set of pre-determined excitation timing parameter relationships may have a sufficient resolution such that transitions between relationships are substantially inaudible to a user of the brushless permanent magnet motor in use The method may comprise determining a mode of operation of the brushless permanent magnet motor corresponding to the motor operating target. For example, different modes of operation may be required to achieve different motor operating targets. A mode of operation may comprise a driving pattern for driving phase current into a phase winding of the brushless permanent magnet motor, and different modes of operation may comprise different driving patterns. A driving pattern may comprise any, or any combination, of a single energisation period, a single de-energisation period, first and second energisation periods and first and second de-energisation periods, energisation and de-energisation periods of varying length, a repeated pattern of energisation period followed by de-energisation period, different methods of de-energisation, advanced commutation of a phase winding relative to a back EMF induced in the phase winding, retarded commutation of a phase winding relative to a back EMF induced in the phase winding, or synchronous commutation of a phase winding relative to a back EMF induced in the phase winding.

Modes of operation of the brushless permanent magnet motor may correspond to different motor operating target thresholds. For example, a motor operating target above a certain operating target threshold may require operation in a different mode to a motor operating target below the operating target threshold. A high power and/or high speed may require a different mode of operation to a low power and/or low speed.

Modes of operation of the brushless permanent magnet motor may overlap, for example such that some motor operating targets lie within more than one mode of operation of the brushless permanent magnet motor. Hysteresis may be applied between modes of operation, for example such that application of the correction factor doesn't cause the motor to change its mode of operation.

The set of pre-determined excitation timing parameter relationships may be dependent on a mode of operation of the brushless permanent magnet motor. Different modes of operation may correspond to different sub-sets of pre-determined excitation timing parameter relationships. A predetermined excitation timing parameter relationship may overlap two or more modes of operation. The method may comprise selecting the most appropriate mode of operation dependent on an excitation timing parameter relationship which gives a motor operating response that is closest to the desired motor operating target.

The method may comprise setting at least one limit for the excitation timing parameter, for example such that the excitation timing parameter cannot exceed the at least one limit upon application of the correction factor. This may be beneficial as it may constrain any variation in the excitation timing parameter, thereby enabling greater control stability and/or improved motor performance. This may also ensure that the motor operates within a desired efficiency range whilst achieving the motor operating target. The at least one limit may also prevent unwanted operation such as overheating, demagnetisation, excessive phase current or states where control response is unstable or highly non-linear.

The at least one limit may comprise an upper and/or lower boundary of the excitation timing parameter.

The at least one limit may correspond substantially to the excitation timing parameter relationship determined from the set of pre-determined excitation timing parameter relationships. The method may comprise applying the correction factor such that the excitation timing parameter moves away from a value of the excitation timing parameter in the excitation timing parameter relationship determined from the set of pre-determined excitation timing parameter relationships, for example such that the excitation timing parameter moves in a single direction away from a value of the excitation timing parameter in the excitation timing parameter relationship determined from the set of pre-determined excitation timing parameter relationships.

The method may comprise applying the correction factor to the excitation timing parameter until the measured motor operating response corresponds substantially to the motor operating target.

The method may comprise applying the correction factor to the excitation timing parameter until the excitation timing parameter reaches the at least one limit. The method may comprise applying a further correction factor to a further excitation timing parameter, for example a further excitation timing parameter within the excitation timing parameter relationship determined from the set of pre-determined excitation timing parameter relationships, once the excitation timing parameter reaches the at least one limit.

The method may comprise operating the brushless permanent magnet motor using an initial excitation timing parameter relationship. Where the initial excitation timing parameter relationship is far removed from the excitation timing parameter relationship determined from the set of pre-determined excitation timing parameter relationships, for example where values of excitation timing parameters within the initial excitation timing parameter relationship differ by greater than 25% of the values of corresponding excitation timing parameters of the excitation timing parameter relationship determined from the set of pre-determined excitation timing parameter relationships, the method may comprise entering a transition mode between the initial excitation timing parameter relationship and the excitation timing parameter relationship determined from the set of pre-determined excitation timing parameter relationships. Entering a transition mode between excitation timing parameter relationships may, for example, comprise accelerating and/or decelerating the brushless permanent magnet motor.

Determining a motor operating target may comprise selecting a motor operating target based on a user input. For example, a user may input a motor operating target using an appropriate user interface, or a user may select a setting which is configured to provide a motor operating target, eg a high or low power mode. Determining a motor operating target may comprise selecting a motor operating target based on a sensor input, for example from a sensor internal or external to the brushless permanent magnet motor.

Operating the motor in accordance with an excitation timing parameter relationship determined from the set of pre-determined excitation timing parameter relationships to provide a motor operating response close to the motor operating target may comprise operating the motor in accordance with an excitation timing parameter relationship determined from the set of pre-determined excitation timing parameter relationships to provide a motor operating response within about 25%, or within about 10%, or within about 5%, or within about 1%, of the value of the motor operating target.

Applying the correction factor to an excitation timing parameter may comprise applying a positive and/or negative correction factor to the excitation timing parameter. The correction factor may comprise an adjustment to the running speed of the brushless permanent magnet motor.

Measuring a measured motor operating response may comprise measuring a motor operating response corresponding to the motor operating target.

According to a further aspect of the present invention there is provided a data carrier comprising machine readable instructions for the operation of a controller of a brushless permanent magnet motor to determine a motor operating target, compare the motor operating target to a set of pre-determined excitation timing parameter relationships, operate the motor in accordance with an excitation timing parameter relationship determined from the set of pre-determined excitation timing parameter relationships to provide a motor operating response close to the motor operating target, measure a measured motor operating response, compare the measured motor operating response to the motor operating target, and apply a correction factor to an excitation timing parameter of the motor when the measured motor operating response does not match the motor operating target, such that the measured motor operating response moves toward the motor operating target.

According to a further aspect of the present invention there is provided a brushless permanent magnet motor comprising a controller configured to determine a motor operating target, compare the motor operating target to a set of pre-determined excitation timing parameter relationships, operate the motor in accordance with an excitation timing parameter relationship determined from the set of pre-determined excitation timing parameter relationships to provide a motor operating response close to the motor operating target, measure a measured motor operating response, compare the measured motor operating response to the motor operating target, and apply a correction factor to an excitation timing parameter of the motor when the measured motor operating response does not match the motor operating target, such that the measured motor operating response moves toward the motor operating target.

According to a further aspect of the present invention there is provided a method of controlling a brushless permanent magnet motor, the method comprising determining a desired motor input power, comparing the desired motor input power to a set of pre-determined excitation timing parameter relationships, operating the motor in accordance with an excitation timing parameter relationship determined from the set of pre-determined excitation timing parameter relationships to provide a motor input power close to the desired motor input power, measuring a measured motor input power, comparing the measured motor input power to the desired motor input power, and applying a correction factor to an excitation timing parameter of the motor when the measured motor input power does not match the desired motor input power, such that the measured motor input power moves toward the desired motor input power.

According to a further aspect of the present invention there is provided a method of controlling a device comprising a brushless permanent magnet motor, the method comprising determining a device output target, determining a motor operating target to achieve the device output target, comparing the motor operating target to a set of predetermined excitation timing parameter relationships, operating the motor in accordance with an excitation timing parameter relationship determined from the set of predetermined excitation timing parameter relationships to provide a motor operating response close to the motor operating target, measuring a measured motor operating response, comparing the measured motor operating response to the motor operating target, and applying a correction factor to an excitation timing parameter of the motor when the measured motor operating response does not match the motor operating target, such that the motor operating response moves toward the motor operating target.

The device output target may comprise any, or any combination, of output airflow and output air temperature. The device output target may be determined by a sensor, which may, for example, comprise part of the device.

BRIEF DESCRIPTION OF THE DRAWINGS

In order to better understand the present invention, and to show more clearly how the invention may be put into effect, the invention will now be described, by way of example, with reference to the following drawings.

DETAILED DESCRIPTION OF THE DISCLOSURE

Figure 1:
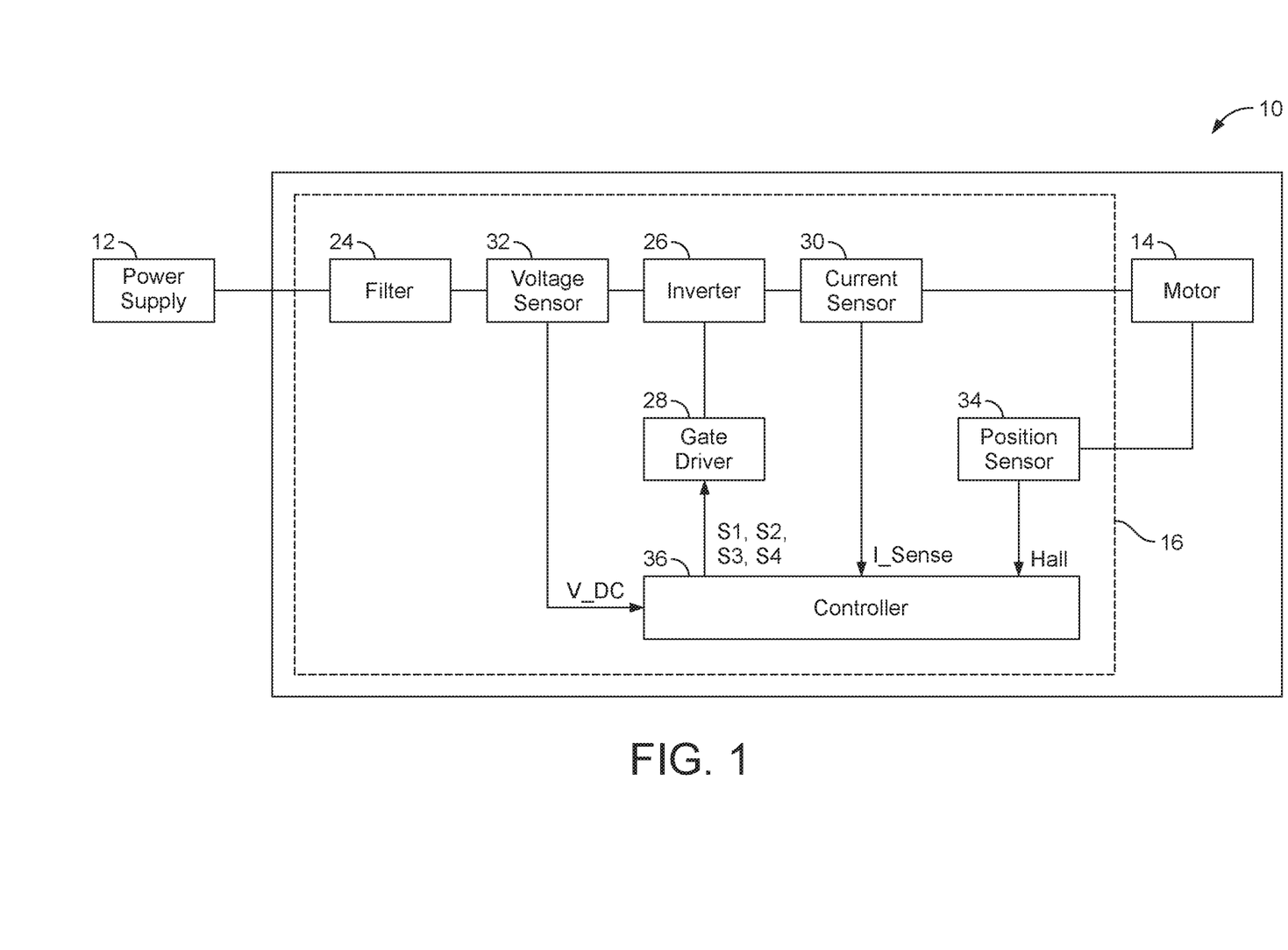
FIG. 1 is a block diagram of a motor system in accordance with the present invention.
Figure 2:
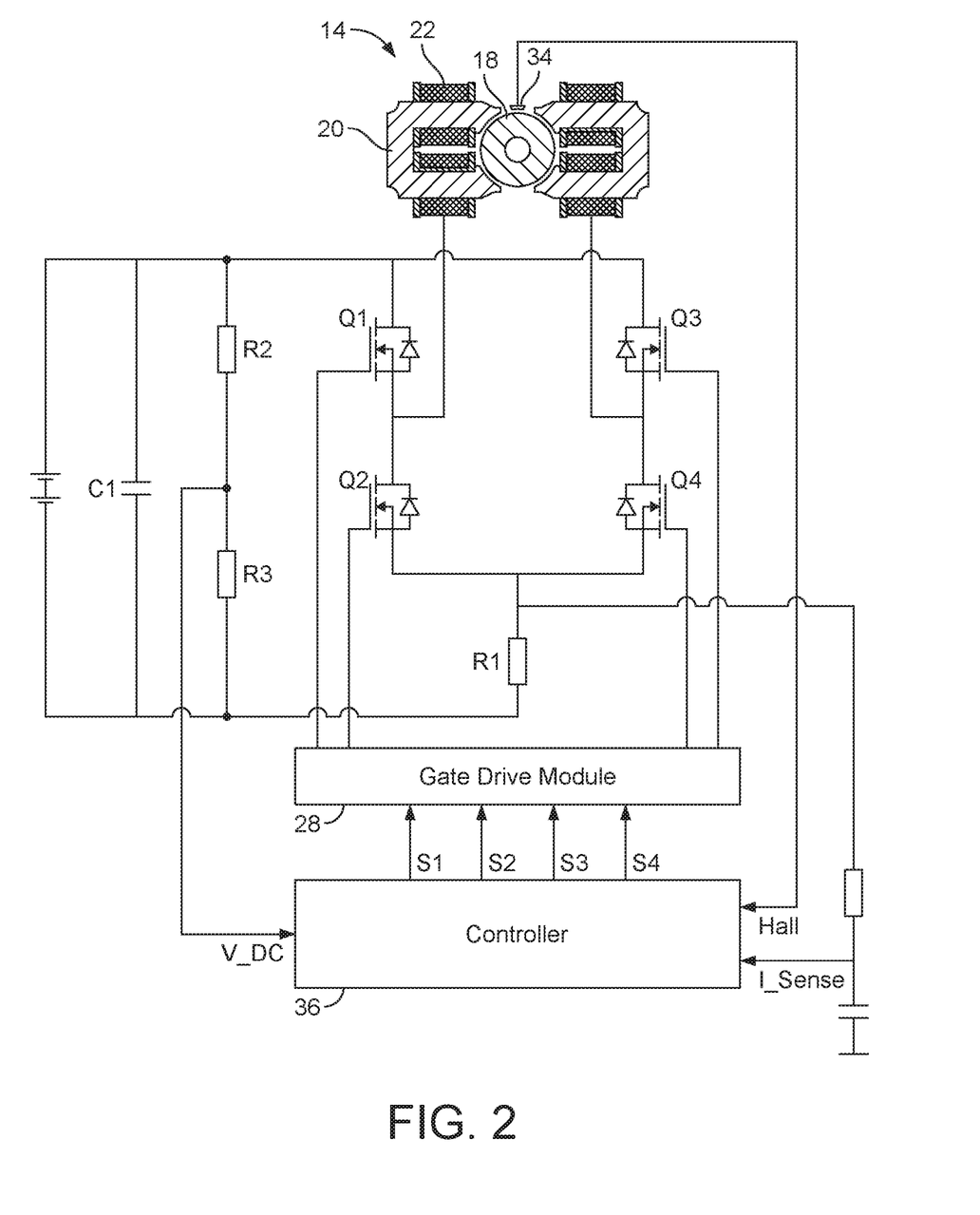
FIG. 2 is a schematic diagram of the motor system of FIG. 1.

A motor system, generally designated 10, in accordance with the present invention, is shown in FIGS. 1 and 2. The motor system 10 is powered by a DC power supply 12, for example a battery, and comprises a brushless permanent magnet motor 14 and a control circuit 16. It will be recognised by a person skilled in the art that the methods of the present invention may be equally applicable to a motor system powered by an AC power supply, with appropriate modification of the circuitry, for example to include a rectifier.

The motor 14 comprises a four-pole permanent-magnet rotor 18 that rotates relative to a four-pole stator 20. Although shown here as a four-pole permanent magnet rotor, it will be appreciated that the present invention may be applicable to motors having differing numbers of poles, for example eight poles. Conductive wires wound about the stator 20 are coupled together to form a single phase winding 22. Whilst described here as a single phase motor, it will be recognised by a person skilled in the art that the teachings of the present application may also be applicable to multiphase, for example three phase, motors.

The control circuit 16 comprises a filter 24, an inverter 26, a gate driver module 28, a current sensor 30, a voltage sensor 32, a position sensor 34, and a controller 36.

The filter 24 comprises a link capacitor C1 that smoothes the relatively high-frequency ripple that arises from switching of the inverter 26.

The inverter 26 comprises a full bridge of four power switches Q1-Q4 that couple the phase winding 22 to the voltage rails. Each of the switches Q1-Q4 includes a freewheel diode.

The gate driver module 28 drives the opening and closing of the switches Q1-Q4 in response to control signals received from the controller 36.

The current sensor 30 comprises a shunt resistor R1 located between the inverter and the zero-volt rail. The voltage across the current sensor 30 provides a measure of the current in the phase winding 22 when connected to the power supply 12. The voltage across the current sensor 30 is output to the controller 36 as signal, I_SENSE. It will be recognised that in this embodiment it is not possible to measure current in the phase winding 22 during freewheeling, but that alternative embodiments where this is possible, for example via the use of a plurality of shunt resistors, are also envisaged.

The voltage sensor 32 comprises a potential divider R2,R3 located between the DC voltage rail and the zero volt rail. The voltage sensor outputs a signal, V_DC, to the controller 36 that represents a scaled-down measure of the supply voltage provided by the power supply 12.

The position sensor 34 comprises a Hall-effect sensor located in a slot opening of the stator 20, although it will be recognised that alternative arrangements, for example where the Hall-effect sensor is positioned adjacent to a positioning magnet on the shaft, are also envisaged. The sensor 34 outputs a digital signal, HALL, that is logically high or low depending on the direction of magnetic flux through the sensor 34. The HALL signal therefore provides a measure of the angular position of the rotor 18. Embodiments are also envisaged in which the position sensor 34 is omitted, and sensorless control schemes are implemented. Such sensorless control schemes are known, and will not be described here for the sake of brevity. In such sensorless schemes, the HALL signal may be replaced by a BACK EMF signal, which is representative of the period of the back EMF.

The controller 36 comprises a microcontroller having a processor, a memory device, and a plurality of peripherals (e.g. ADC, comparators, timers etc.). In an alternative embodiment, the controller 36 may comprise a state machine. The memory device stores instructions for execution by the processor, as well as control parameters that are employed by the processor during operation. The controller 36 is responsible for controlling the operation of the motor 14 and generates four control signals S1-S4 for controlling each of the four power switches Q1-Q4. The control signals are output to the gate driver module 28, which in response drives the opening and closing of the switches Q1-Q4.

Figure 3:
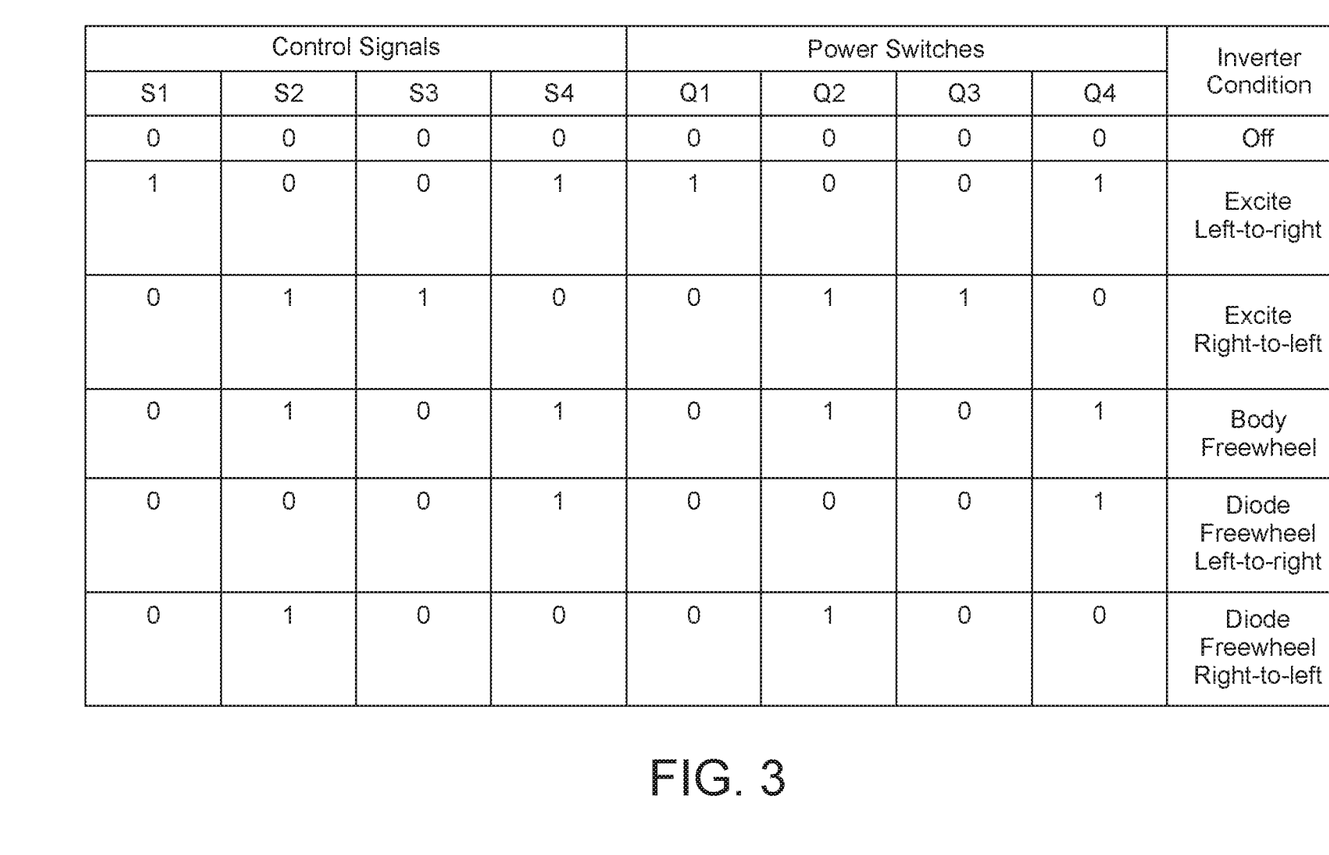
FIG. 3 details allowed states of an inverter of the motor system of FIG. 1 in response to control signals issued by a controller of the motor system.

FIG. 3 summarises the allowed states of the switches Q1-Q4 in response to the control signals S1-S4 output by the controller 36. Hereafter, the terms 'set' and 'clear' will be used to indicate that a signal has been pulled logically high and low respectively. As can be seen from FIG. 3, the controller 36 sets S1 and S4, and clears S2 and S3 in order to excite the phase winding 22 from left to right. Conversely, the controller 36 sets S2 and S3, and clears S1 and S4 in order to excite the phase winding 22 from right to left. The controller 36 clears S1 and S3, and sets S2 and S4 in order to freewheel the phase winding 22. Freewheeling enables current in the phase winding 22 to re-circulate around the low-side loop of the inverter 26. In the present embodiment, the power switches Q1-Q4 are capable of conducting in both directions. Accordingly, the controller 36 closes both low-side switches Q2,Q4 during freewheeling such that current flows through the switches Q2,Q4 rather than the less efficient diodes. Conceivably, the inverter 26 may comprise power switches that conduct in a single direction only. In this instance, the controller 36 would clear S1, S2 and S3, and set S4 so as to freewheel the phase winding 22 from left to right. The controller 36 would then clear S1, S3 and S4, and set S2 in order to freewheel the phase winding 22 from right to left. Current in the low-side loop of the inverter 26 then flows down through the closed low-side switch (e.g. Q4) and up through the diode of the open low-side switch (e.g. Q2).

Where the speed of the rotor 18 is above a pre-determined threshold, for example above 40 krpm, the controller 36 operates in a steady-state mode. The speed of the rotor 18 is determined from the interval between successive edges of the HALL signal, which will hereafter be referred to as the HALL period.

The controller 36 commutates the phase winding 22 in response to edges of the HALL signal. Each HALL edge corresponds to a change in the polarity of the rotor 18, and thus a change in the polarity of the back EMF induced in the phase winding 22. More particularly, each HALL edge corresponds to a zero-crossing in the back EMF. Commutation involves reversing the direction of current through the phase winding 22. Consequently, if current is flowing through the phase winding 22 in a direction from left to right, commutation involves exciting the winding from right to left.

The controller 36 may advance, synchronise or retard commutation relative to the HALL edges, and hereafter the phase angle at which the controller 36 commutates the phase winding 22 will be referred to as the advance angle, irrespective of whether commutation is advanced, synchronised or retarded. The period over which current is driven into the phase winding 22 is hereafter referred to as the conduction period, and the controller 36 may vary the advance angle or conduction period to obtain desired operating characteristics.

Figure 4:
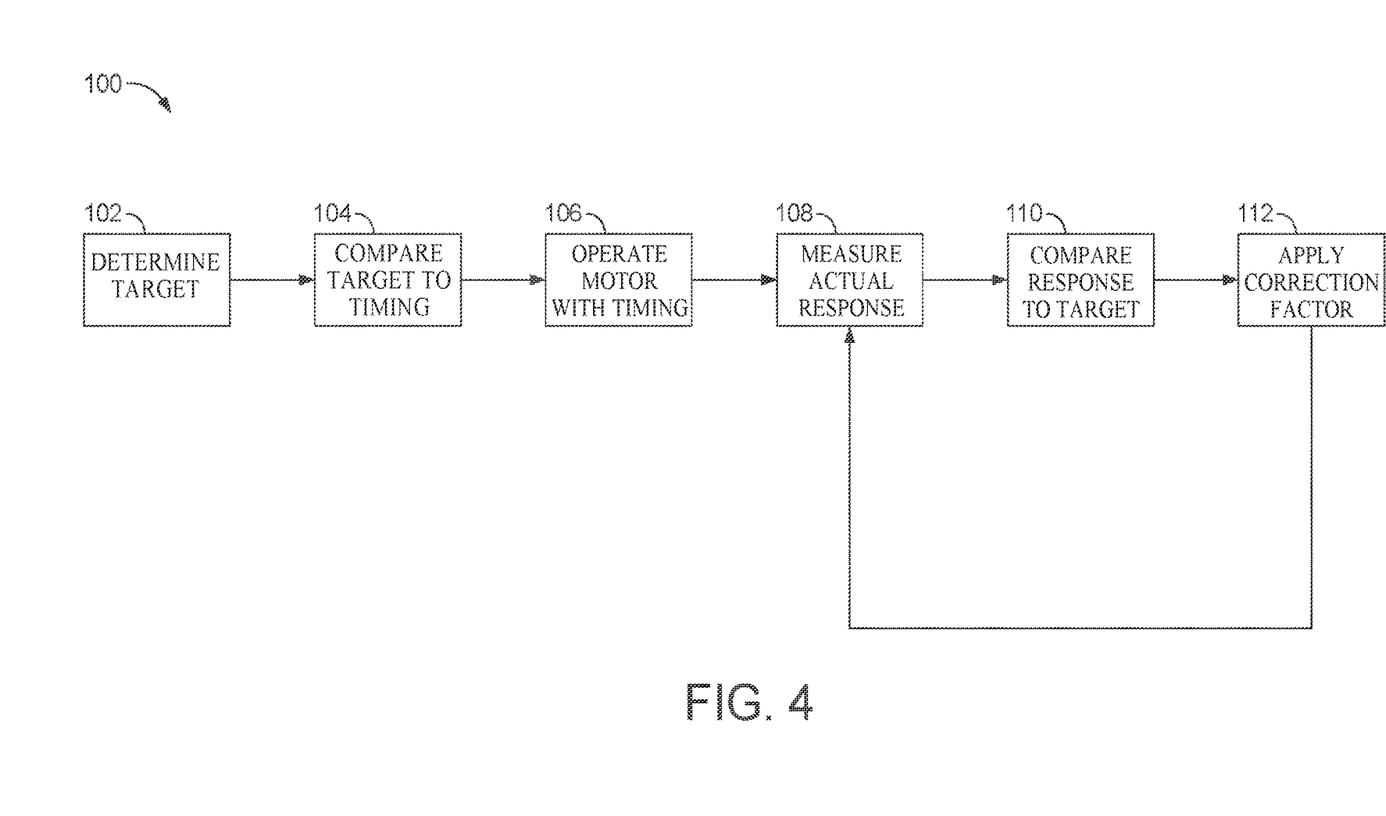
FIG. 4 is a schematic flow diagram illustrating a method of controlling the motor system of FIGS. 1 and 2 according to the present invention.

A method according to the present invention will now be described with reference to FIG. 4.

The method 100 comprises determining 102 a motor operating target. The motor operating target is determined by a user inputting their motor operating target, or, for example, is determined from a mode selected by a user. The motor operating target is compared 104 to a set of pre-determined excitation timing parameter relationships, which are stored in memory of the controller 36. Each pre-determined excitation timing parameter relationship is established via experimentation or computational simulation. In the present case an excitation timing parameter relationship is a relationship between a motor operating target or response and the excitation timing parameter values that need to be implemented in order to achieve the motor operating target or response. It will be recognised by a person skilled in the art that each excitation timing parameter may itself be determined by a further characteristic relationship, which may be determined by other operating characteristics of the motor 14.

In response to the comparison 104, the controller 30 operates 106 the motor 14 in accordance with an excitation timing parameter relationship determined from the set of pre-determined excitation timing parameter relationships to provide a motor operating response close to the motor operating target, say within a 25% error margin of the motor operating target.

An actual motor operating response is measured 108, and the measured motor operating response is compared 110 to the motor operating target. If the measured motor operating response does not match the motor operating target, then a correction factor is applied 112 to an excitation timing parameter of the motor such that the measured motor operating response moves toward the motor operating target.

In such a manner, the measured motor operating response may be closely controlled to match the motor operating target in a closed feedback loop manner. However, simply controlling the brushless permanent magnet motor 14 in such a closed loop manner may result in unstable and/or inefficient control, for example as a result of large correction factors being required to compensate for errors between the measured motor operating response and the desired motor operating target.

By comparing 104 the motor operating target to a set of pre-determined excitation timing parameter relationships, and operating 106 the motor 14 in accordance with an excitation timing parameter relationship determined from the set of pre-determined excitation timing parameter relationships to provide a motor operating response close to the motor operating target, the closed loop control may be provided with a starting point sufficiently close to the motor operating target that large correction factors to the excitation timing parameters are not required. Hence the method 100 according to the present invention may provide greater stability and improved motor performance relative to a method which simply uses closed loop control.

It will be appreciated by a person skilled in the art that the method 100 may be used to control a number of motor operating responses, including, for example, motor input power, motor speed, airflow through the motor, phase voltage, DC link voltage, phase current, supply current, motor pressure, motor temperature, or an error function combining any of the aforementioned parameters. Where the motor operating target comprises the minimisation of an error function, the error function may take the form of the equation shown below:

$$\text{error} = K1*(\text{target input power} - \text{measured input power}) + K2*(\text{target speed} - \text{measured speed})$$

where K1 and K2 are relative weighting factors of each target. In the above the target speed could be set at a maximum achievable for the motor and the target input power to a minimum thus the control system would seek to reduce target input power for maximum speed in a manner defined by the weighting factors. This would give a peak efficiency for a given set of system constraints.

It will further be appreciated by a person skilled in the art that the excitation timing parameter may comprise a parameter which defines when the motor 14 is commutated and/or when excitation of the motor 14 begins and/or ends, and/or how long the motor 14 is excited for. For example, the excitation timing parameter may be any or any combination of an advance angle, a conduction period, a de-energisation (or freewheel) angle, a de-energisation (or freewheel) period, or a duty cycle.

Figure 5:
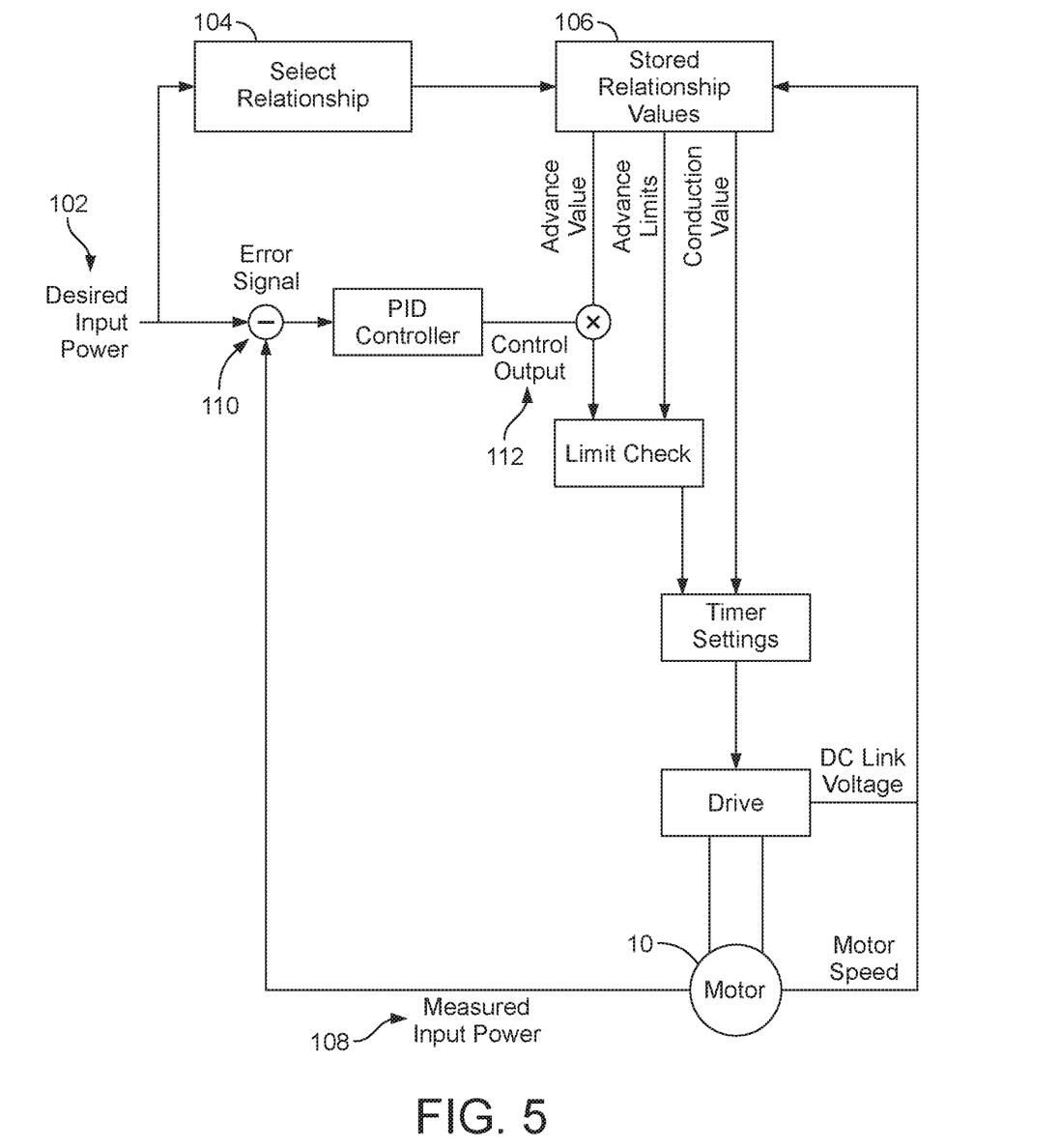
FIG. 5 is a schematic block diagram illustrating a control structure for use with the method of FIG. 4.

A practical embodiment of the method 100 will be described with reference to FIG. 5, and refers to an instance where the motor operating target is a motor input power.

A desired motor input power is determined 102 by a user inputting a desired motor input power, or is determined from a mode selected by a user. The desired motor input power determines a mode of control of the brushless permanent magnet motor 14.

Figure 6:
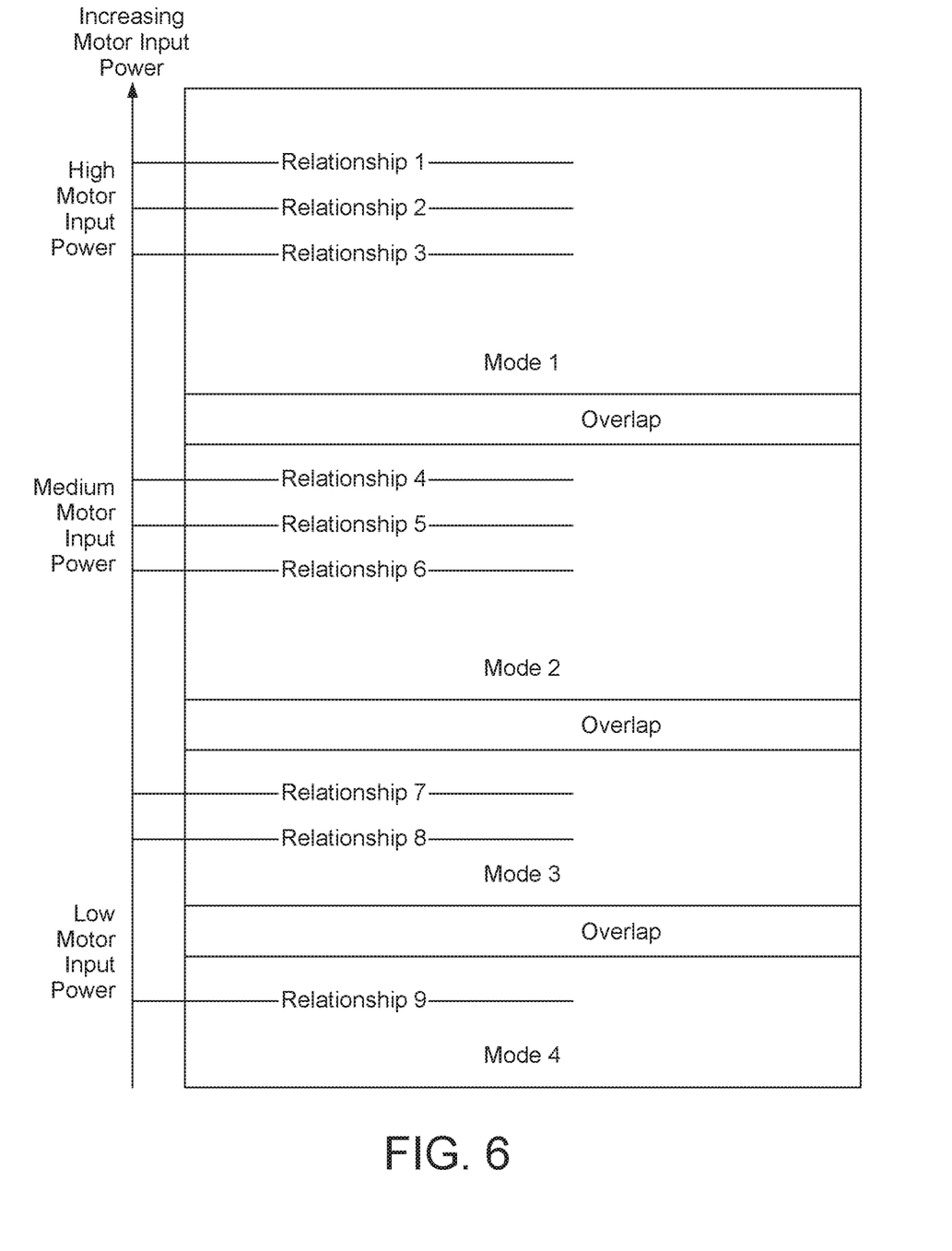
FIG. 6 is a schematic motor power envelope in accordance with the present invention.

For example, as can be seen from FIG. 6, the mode of control of the motor 14 is dependent on the motor input power. Where the motor input power is at a high level, the motor 14 is controlled such that commutation occurs in advance of zero-crossings of back EMF, a single excitation period occurs in each electrical half-cycle, followed by a dual-FET freewheel period. This is referred to in FIG. 6 as Mode 1. Where the motor input power is at a medium level, the motor 14 is controlled such that commutation occurs in advance of zero-crossings of back EMF, two excitation periods occur in each electrical half-cycle, each followed by a dual-FET freewheel period. This is referred to as Mode 2 in FIG. 6. Where the motor input power is at a medium to low level, the motor 14 is controlled such that commutation is retarded relative to zero-crossings of back EMF a single excitation period occurs in each electrical half-cycle, followed by a turn-off of the bridge of switches Q1-Q4. This is referred to as Mode 3 in FIG. 6. Where the motor input power is low, for example around a minimum input power, pulse width modulation (PWM) of the input voltage occurs, with commutation of the motor 14 being synchronous with zero-crossings of back EMF induced by the motor 14. This is referred to as Mode 4 in FIG. 6.

Thus it can be seen that the desired motor input power determined 102 by a user impacts on the mode of control of the brushless permanent magnet motor 14. Some desired motor input powers may span more than one mode of control, and in this case the controller 30 will choose the most appropriate mode of control on a case by case basis. The controller 30 also employs hysteresis control to ensure that the motor 14 doesn't oscillate between different modes of control.

The mode of control of the motor 14 also has an influence on the excitation timing parameter relationship which determines the desired motor input power, as can be seen from FIG. 6, with different relationships being present for different modes. In particular, where the motor input power is at a high level, and the motor is controlled in Mode 1, the excitation timing parameter relationship may have an advance angle as a primary excitation timing parameter, and a conduction period as a secondary excitation timing parameter. Where the motor input power is at a medium level, and the motor is controlled in Mode 2, the excitation timing parameter relationship may have a freewheel period as a primary excitation timing parameter, and a conduction period as a secondary excitation timing parameter, or the excitation timing parameter relationship may have an advance angle as a primary excitation timing parameter, and a freewheel period as a secondary excitation timing parameter. Where the motor input power is at a medium to low level, and the motor is controlled in Mode 3, the excitation timing parameter relationship may have a conduction period as a primary excitation timing parameter, and an advance angle as a secondary excitation timing parameter. Where the motor input power is at a low level, and the motor is controlled in Mode 4, the excitation timing parameter may have a duty cycle as a primary excitation timing parameter.

Thus it can be seen that the desired motor input power determined 102 by a user is also linked to an excitation timing parameter relationship. In this regard, the method 100 comprises comparing the desired motor input power to a set of pre-determined excitation timing parameter relationships, which are, for example, stored in memory of the controller 30. Each of the set of pre-determined excitation timing parameter relationships links a motor input power to a set of excitation timing parameters which can be implemented to achieve said motor input power.

The method 100 comprises operating 106 the motor 14 in accordance with an excitation timing parameter relationship determined from the set of pre-determined excitation timing parameter relationships to provide a motor input power close to the desired motor input power, say, for example, a motor input power that is within 25% of the value of the desired motor input power. If the desired motor input power lies within a single control mode, then the two closest excitation timing parameter relationships may be interpolated to obtain an operating excitation timing parameter relationship. If, however, the desired motor input power overlaps multiple control modes, then a single excitation timing parameter relationship that provides a motor input power closest to the desired motor input power is selected as an operating excitation timing parameter relationship.

In practice, and to ensure a practical control scheme, the operating excitation timing parameter relationship is taken as an upper or lower limit for the excitation timing parameter values, such that the excitation timing parameter values can only be altered in one direction, for example increased or decreased, to achieve the desired motor input power. This may allow the relationship to change in a well-defined manner, and may make the end-point value more repeatable.

If the operating excitation timing parameter relationship is significantly removed from a previous operating excitation timing parameter relationship, then the controller 30 implements a transition mode whereby the motor 14 is accelerated or decelerated as appropriate to provide a gradual transition to the operating excitation timing parameter.

Once an operating excitation timing parameter is chosen and implemented, the actual motor input power is then measured 108, and the measured motor operating input power is compared 110 to the desired motor input power. If the measured motor input power does not match the desired motor input power, then a correction factor is applied 112 to an excitation timing parameter of the motor such that the measured input power moves toward the desired motor input power.

In this regard, and as mentioned above, each excitation timing parameter relationship may comprise multiple excitation timing parameters, and excitation timing parameters within an excitation timing parameter relationship may be afforded different priorities. For example, where a desired motor input power is relatively high, an advance angle may be viewed as a primary excitation timing parameter, whilst a conduction period may be viewed as a secondary excitation timing parameter. Applying 112 a correction factor may involve applying a first correction factor to a primary excitation timing parameter and/or applying a second correction factor to a secondary excitation timing parameter.

Alternatively, applying a correction factor may involve, for example, a ratio between the primary and secondary excitation timing parameters, for example one secondary excitation timing parameter increment for each two primary excitation timing parameter increments. The type of correction factor applied will be dependent on the excitation timing parameter relationship implemented, as will be appreciated by a person skilled in the art.

Each excitation timing parameter may be defined by other motor operating characteristics. For example, advance angles and conduction periods may be defined by the relationships set-out below:

Advance Time:

$$AP00+AP10\times V+AP01\times S+AP20\times V^2+AP02\times S^2+AP11\times V\times S+AP30\times V^3 \pm \text{correction}$$

Conduction Time:

$$CP00+CP10\times V+CP01\times S \pm \text{correction}$$

where APXX and CPXX are coefficients determined from simulation and measurement, S is motor rotor speed, and V is the motor input voltage. The results of the above equations are altered by applying 112 the correction factor.

Where the correction factor is applied 112 to the excitation timing parameter, a pre-determined limit for the excitation timing parameter is imposed, thereby ensuring optimum operating conditions for the motor 14. For example, as can be seen from FIG. 7, motor efficiency may vary with motor input power in a non-linear manner in response to a change in conduction period. Whilst there may be multiple points along the motor input power curve which have the same value, for example the desired motor input power value, each of these points may result in a different motor operating efficiency. By setting a pre-determined limit for the excitation timing parameter, the motor may be prevented from operating at the desired motor input power with a low motor operating efficiency.

Figure 7:
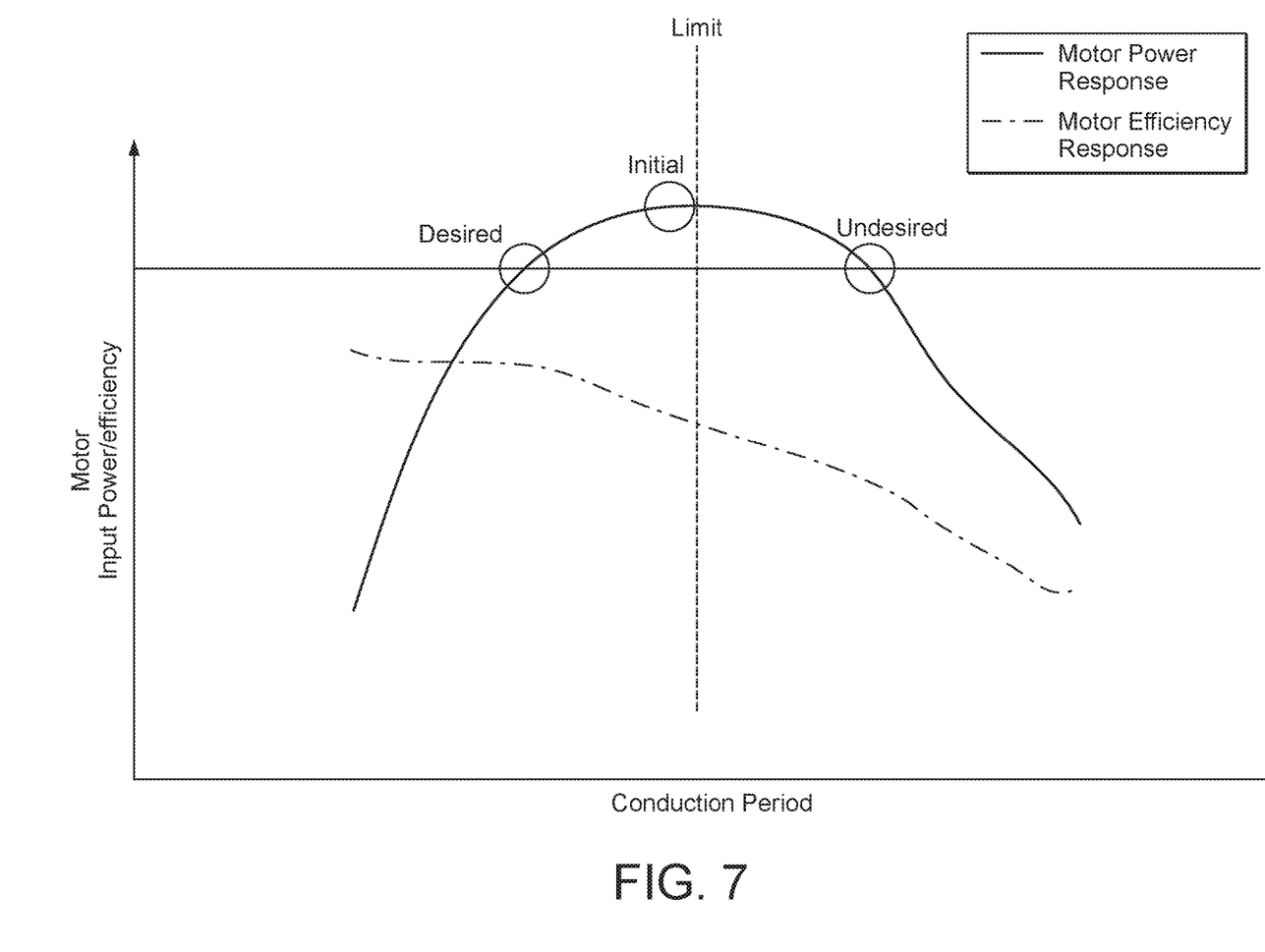
FIG. 7 is a schematic diagram illustrating motor input power and efficiency variation with respect to conduction period.

If the primary excitation timing parameter hits the pre-determined limit before the measured motor input power reaches the desired motor input power, then a second correction factor is applied to the secondary excitation timing parameter until the measured motor input power reaches the desired motor input power. Of course, it is also possible that the measured motor input power reaches the desired motor input power before the primary excitation timing parameter reaches its pre-determined limit, in which case application of a correction factor to the secondary excitation timing parameter may be unnecessary.

Measurement 108 of the desired motor input power, comparison 110 of the measured motor input power to the desired motor input power, and subsequent application 112 of a correction factor is applied in a closed loop manner to continuously hunt for the desired motor input power.

It will be recognised by a person skilled in the art that the method 100 will be applicable to other desired motor operating targets with minimal adjustment to the method steps described above.

Figure 8:
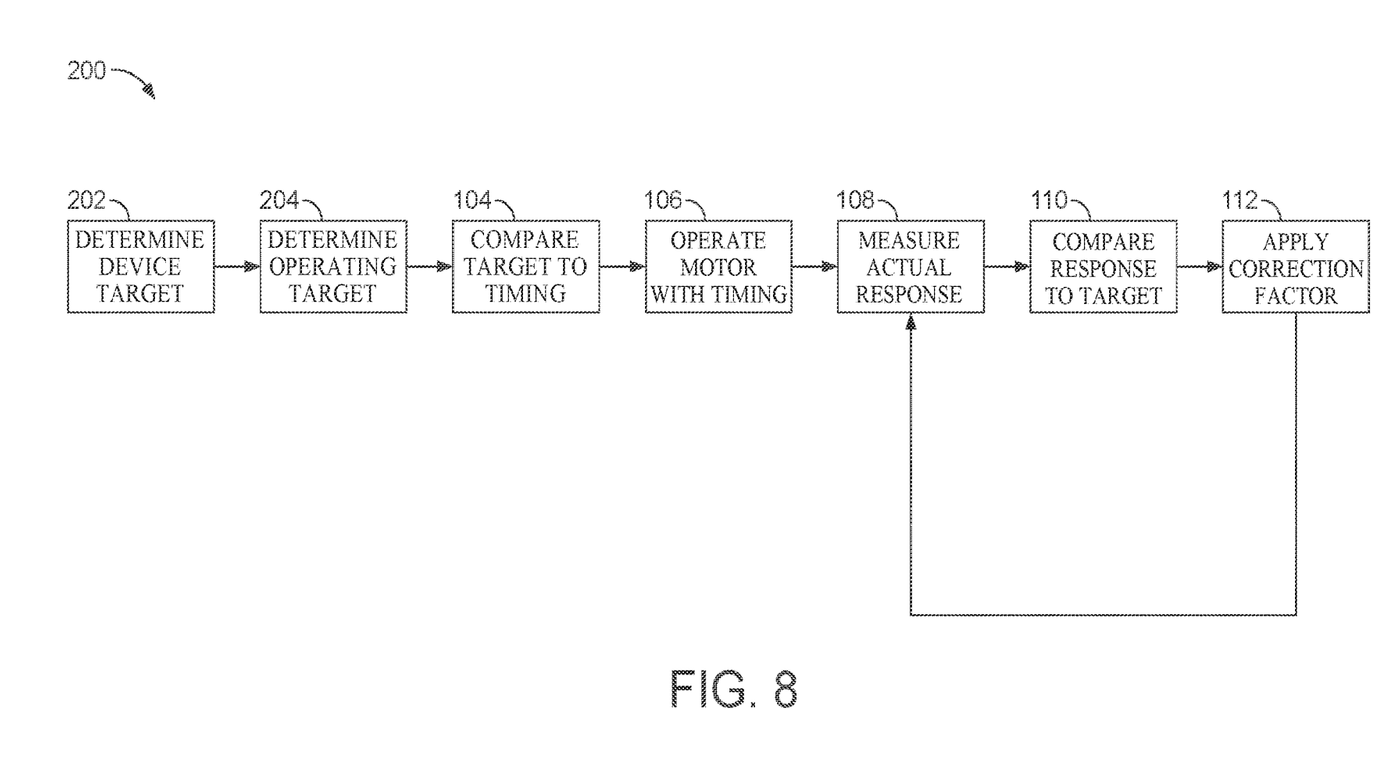
FIG. 8 is a schematic flow diagram illustrating a further method according to the present invention.

It will further be recognised by a person skilled in the art that the method 100 may be modified slightly, as shown in FIG. 8 to provide a method 200 of controlling a device which comprises the brushless permanent magnet motor 14.

The method 200 is substantially similar to the previously described method 100, and differs only in the additional steps of determining 202 a device output target, and determining 204 a motor operating target to achieve the device output target. The other steps of the method 200 are also present in the previously described method 100, and hence like reference numerals are used in FIG. 8 for consistency.

The invention claimed is:

1. A method of controlling a brushless permanent magnet motor, the method comprising operating the motor in an open loop control and subsequently operating the motor in a closed loop control, wherein:
    operating the motor in the open loop control comprises:
        determining a motor operating target for the motor;
        determining, based on the motor operating target, an excitation timing parameter relationship from a set of pre-determined excitation timing parameter relationships for the motor, wherein the determined excitation timing parameter relationship defines one or more excitation timing parameter values that correspond to the motor operating target; and
        operating the motor in accordance with the one or more excitation timing parameter values to provide a motor operating response close to the motor operating target; and
    operating the motor in the closed loop control comprises:
        measuring a measured motor operating response of the motor being operated in accordance with the one or more excitation timing parameter values;
        comparing the measured motor operating response to the motor operating target; and
        applying a correction factor to the one or more excitation timing parameter values when the measured motor operating response does not match the motor operating target, such that the motor operating response is directed towards the motor operating target.

2. The method of claim 1, wherein the excitation timing parameter comprises a parameter which defines when the motor is commutated or when excitation of the motor begins or ends, or how long the motor is excited for.

3. The method of claim 1, wherein the motor operating target comprises any, or any combination of, motor input power, motor speed, airflow through the motor, phase voltage, DC link voltage, phase current, supply current, motor pressure, motor temperature, and an error function of the aforementioned parameters.

4. The method of claim 1, wherein the method comprises determining a mode of operation of the brushless permanent magnet motor corresponding to the motor operating target.

5. The method of claim 1, wherein the method comprises setting at least one limit for the excitation timing parameter.

6. The method of claim 5, wherein the method comprises applying the correction factor to the excitation timing parameter until the excitation timing parameter reaches the at least one limit.

7. The method of claim 6, wherein the method comprises applying a further correction factor to a further excitation timing parameter once the excitation timing parameter reaches the at least one limit.

8. The method of claim 1, wherein the method comprises operating the brushless permanent magnet motor using an initial excitation timing parameter relationship, and where the initial excitation timing parameter relationship is far removed from the excitation timing parameter relationship determined from the set of pre-determined excitation timing parameter relationships, the method comprises entering a transition mode between the initial excitation timing parameter relationship and the excitation timing parameter relationship determined from the set of pre-determined excitation timing parameter relationships.

9. The method of claim 1, wherein operating the motor in accordance with the one or more excitation timing parameter values provides a motor operating response within 25%, or within 10%, or within 5%, or within 1% of the value of the motor operating target.

10. A non-transitory computer readable storage medium comprising machine readable instructions for the operation of a controller of a brushless permanent magnet motor to operate the motor in an open loop control and subsequently operate the motor in a closed loop control, wherein:
operating the motor in the open loop control comprises:
determining a motor operating target for the motor;
determining, based on the motor operating target, an excitation timing parameter relationship from a set of pre-determined excitation timing parameter relationships for the motor, wherein the determined excitation timing parameter relationship defines one or more excitation timing parameter values that correspond to the motor operating target; and
operating the motor in accordance with the one or more excitation timing parameter values to provide a motor operating response close to the motor operating target; and
operating the motor in the closed loop control comprises:
measuring a measured motor operating response of the motor being operated in accordance with the one or more excitation timing parameter values;
comparing the measured motor operating response to the motor operating target; and
applying a correction factor to the one or more excitation timing parameter values when the measured motor operating response does not match the motor operating target, such that the motor operating response is directed towards the motor operating target.

11. A brushless permanent magnet motor comprising a controller configured to operate the motor in an open loop control and subsequently operate the motor in a closed loop control, wherein:
operating the motor in the open loop control comprises:
determining a motor operating target for the motor;
determining, based on the motor operating target, an excitation timing parameter relationship from a set of pre-determined excitation timing parameter relationships for the motor, wherein the determined excitation timing parameter relationship defines one or more excitation timing parameter values that correspond to the motor operating target; and
operating the motor in accordance with the one or more excitation timing parameter values to provide a motor operating response close to the motor operating target; and
operating the motor in the closed loop control comprises:
measuring a measured motor operating response of the motor being operated in accordance with the one or more excitation timing parameter values;
comparing the measured motor operating response to the motor operating target; and
applying a correction factor to the one or more excitation timing parameter values when the measured motor operating response does not match the motor operating target, such that the motor operating response is directed towards the motor operating target.

12. A method of controlling a device comprising a brushless permanent magnet motor, the method comprising:
determining a device output target;
operating the motor in an open loop control; and
subsequently operating the motor in a closed loop control, wherein:
operating the motor in the open loop control comprises:
determining a motor operating target to achieve the device output target;
comparing the motor operating target to a set of pre-determined excitation timing parameter relationships to determine an excitation timing parameter relationship for the motor based on the motor operating target, wherein the determined excitation timing parameter relationship defines one or more excitation timing parameter values that correspond to the motor operating target; and
operating the motor in accordance with the one or more excitation timing parameter values to provide a motor operating response close to the motor operating target; and
operating the motor in the closed loop control comprises:
measuring a measured motor operating response of the motor being operated in accordance with the one or more excitation timing parameter values;
comparing the measured motor operating response to the motor operating target; and
applying a correction factor to the one or more excitation timing parameter values when the measured motor operating response does not match the motor operating target, such that the motor operating response is directed towards the motor operating target.

13. The method of claim 12, wherein the device output target comprises any, or any combination, of output airflow and output air temperature.

14. The method according to claim 1, wherein the determining the excitation timing parameter relationship comprises determining the excitation timing parameter relationship from the set of pre-determined excitation timing parameter relationships for the motor prior to operation of the motor.

15. The non-transitory computer readable storage medium according to claim 10 further comprising machine readable instructions for the operation of the controller of the brushless permanent magnet motor to determine the excitation timing parameter relationship from the set of pre-determined excitation timing parameter relationships for the motor prior to operation of the motor.

16. The brushless permanent magnet motor according to claim 11, wherein the controller is configured to:
determine the excitation timing parameter relationship prior to operation of the motor.

17. The method according to claim 12, wherein the comparing the motor operating target to the set of pre-determined excitation timing parameter relationships comprises comparing the motor operating target to the set of pre-determined excitation timing parameter relationships to determine the excitation timing parameter relationship for the motor prior to operation of the motor.

* * * * *